Aug. 3, 1948. P. MOVITZ 2,446,296
TOY MOTOR
Filed June 20, 1946
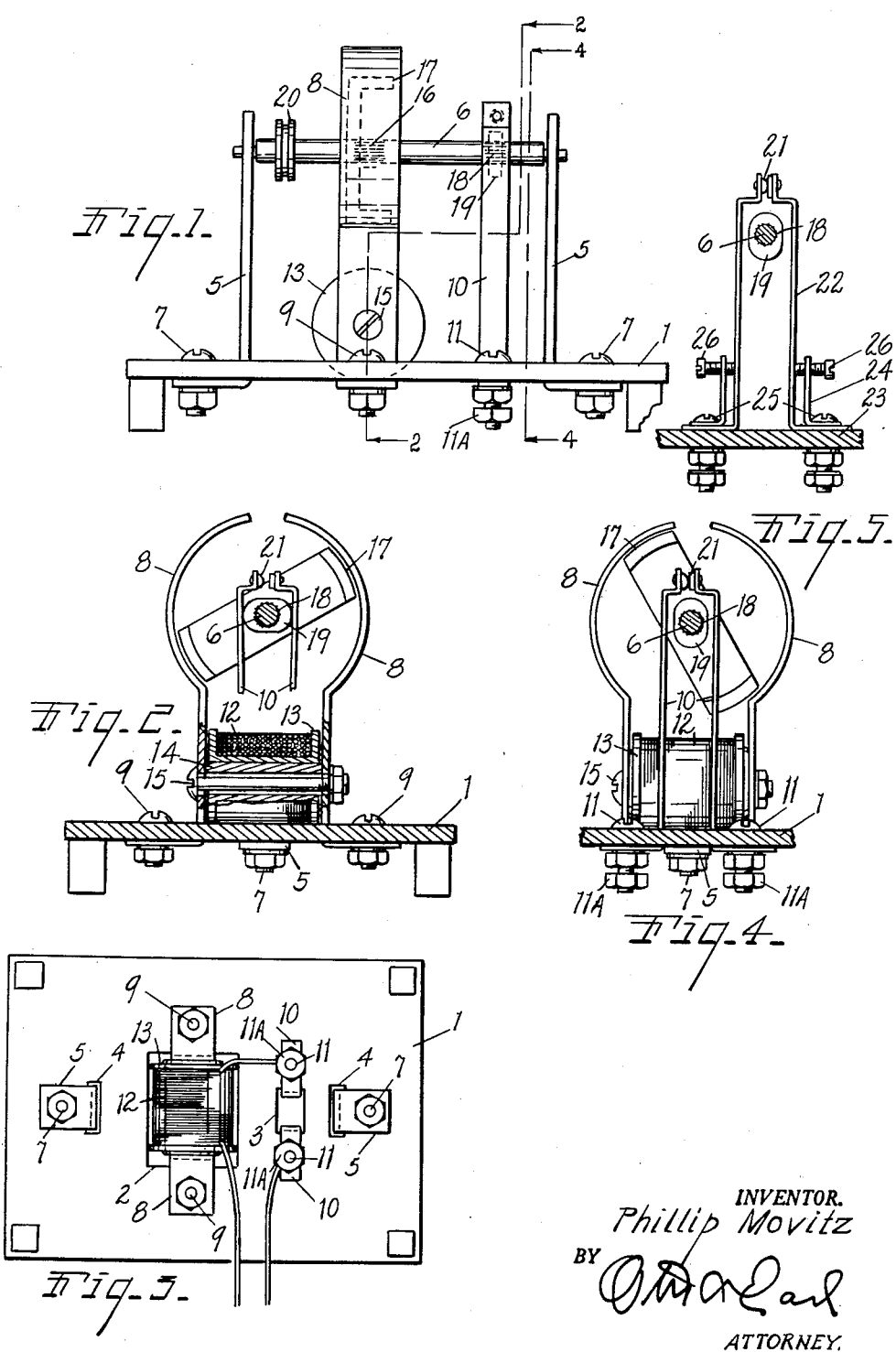
INVENTOR.
Phillip Movitz
BY
ATTORNEY.

Patented Aug. 3, 1948

2,446,296

UNITED STATES PATENT OFFICE 2,446,296

TOY MOTOR

Phillip Movitz, Grand Rapids, Mich.

Application June 20, 1946, Serial No. 678,009

8 Claims. (Cl. 172—36)

This invention relates to improvements in toy motor.

The main objects of this invention are:

First, to provide a motor which can be assembled in operative position by a child of ordinary intelligence.

Second, to provide a motor which is adjustable for demonstrating maximum and minimum power adjustments.

Third, to provide a motor with novel adjusting mechanism for its contact points.

Fourth, to provide a motor in which all the essential parts are separable to better illustrate their function.

Other objects relating to details of construction will appear from the following description.

A preferred form and one modification are shown in the drawings, of which there is one sheet.

Fig. 1 represents an elevational view of the preferred form of the motor.

Fig. 2 represents a cross-sectional view taken along the broken line 2—2 in Fig. 1.

Fig. 3 represents a view of the bottom of the motor.

Fig. 4 represents a cross-sectional view taken along the line 4—4 in Fig. 1.

Fig. 5 represents a cross-sectional view showing a modified form of the invention.

The motor is assembled on a base 1 which defines a central rectangular aperture 2, a smaller aperture 3 and two spaced rectangular slots 4. A pair of flanged uprights 5 extend upwardly through the slots 4 to support the ends of the shaft 6. Bolts 7 secure the flanged ends of the uprights to the base. The flanged field pieces 8 are secured to the base by bolts 9 and extend upwardly through the aperture 2 with their concave surfaces opposing each other. A pair of flanged contact bars 10 extend upwardly through the smaller aperture 3 and are secured to the base by bolts 11. The bolts 11 serve as connecting terminals for the motor and are provided with extra nuts 11A for holding the wires thereto. Lock washers are provided on all of the bolts.

A field coil 12 is wound on a bobbin 13 of insulating material and is arranged to fit over the hollow cylindrical iron core 14. The core 14 fits between the lower ends of the field pieces which are drawn tight against the ends of the core by the bolt 15. The free ends of the coil are brought out below the base 1 and arranged to be connected one to one of the bolts 11 and the other to a power source such as a 1½ volt battery. The other lead to the battery is connected to the other bolt 11.

The shaft 6 is provided with a serrated portion 16 arranged to frictionally engage the simple U-shaped armature 17 formed of flat steel stock and a second serrated portion 18 arranged to frictionally engage the cam member 19. A pulley 20 is formed on the shaft for transmitting power to other toys. Contact points 21 are secured to the upper ends of the contact bars 10.

When assembled and connected to a battery, the motor will operate in the well known fashion. The relative angular position of the armature and the cam may be changed on the serrated portions of the shaft to demonstrate the proper settings for minimum and maximum power and speed.

In the modification shown in Fig. 5 the contact bars 22 are mounted on the top of the base 23 and adjusting brackets 24 are secured on top of the flanged ends of the contact bars by the bolts 25. Adjusting screws 26 are threaded through the upper ends of the brackets to adjust the pressure with which the contact points are brought together. This adjustment permits a minimum of pressure to be exerted on the cam. All other parts of the motor remain the same as in the preferred form of the invention.

I have described a preferred embodiment and one modification of my invention. No attempt has been made to show further adaptations, as it is believed that this disclosure will enable those skilled in the art to adapt the invention as may be desired.

Having thus described my invention, what I claim as new and desire to secure by Letters Patent is:

1. A toy motor comprising a base defining spaced slots and a pair of apertures therebetween, a pair of flanged shaft supports extending through said slots and secured to said base, a pair of flanged metal field pieces extending through one of said apertures and secured to said base in spaced relationship, a pair of flanged contact bars extending through the other of said apertures and secured to said base, a shaft rotatably mounted in said shaft supports and having a serrated portion between said contact bars, an iron core secured between said field pieces, a coil positioned around said core, an armature positioned on said shaft between said field pieces and a cam positioned on the serrated portion of said shaft.

2. A base for a toy electric motor defining a pair of spaced slots for receiving shaft support members and a pair of apertures therebetween for receiving a pair of field pieces and a pair of contact bars.

3. A base for a toy electric motor defining a pair of spaced slots for receiving shaft support members and a pair of apertures therebetween for receiving a pair of field pieces and a pair of contact bars, said base being further apertured to receive fastening means for said shaft supports, field pieces and contact bars.

4. In combination with a toy electric motor having a shaft with a cam thereon, a base, contact bars secured to said base and extending upwardly on each side of said cam, a brace bracket secured to said base and spaced from one of said bars, and a screw member threaded through said bracket and engageable with said bar.

5. In combination with a toy electric motor having a shaft with a cam thereon, a base, a pair of contact bars secured to said base and extending upwardly on each side of said cam, a pair of contacts on the upper ends of said bars, a pair of brace brackets secured to said base, and screw members threaded through said brackets engageable with said bars for adjusting the pressure between said contacts.

6. In combination with a toy electric motor having a shaft with a cam thereon, a base, a pair of contact bars secured to said base and extending upwardly on each side of said cam, a pair of contacts on the upper ends of said bars, a pair of brace brackets secured to said base, and screw members threaded through said brackets engageable with said bars for adjusting the pressure between said contacts, said brace brackets being secured to said base by the same means as said contact bars.

7. A toy motor comprising a base of insulating material, strap-like field pieces disposed through said base and having laterally turned end portions detachably secured to the under side of the base, said field pieces having oppositely curved upper ends, a field coil disposed between and mounted on said field pieces below said oppositely curved upper end portions thereof and constituting a connecting element therefor, shaft supporting uprights arranged through said base in spaced relation to said field pieces and having laterally turned ends detachably secured to the under side of said base, a shaft mounted on said uprights and provided with an armature rotatable within and coacting with said field pieces, a pair of resilient, normally engaging contact bars arranged through said base and having laterally turned ends detachably secured to the under side of said base by means of bolts which constitute binding posts, and a cam of insulating material disposed on said shaft between said contact bars and acting to separate them on each revolution of the shaft.

8. A toy motor comprising a base of insulating material, strap-like field pieces having laterally turned bottom end portions detachably secured to the base, said field pieces having oppositely curved upper ends, a field coil disposed between and detachably mounted on said field pieces below said oppositely curved upper end portions thereof, shaft supporting uprights detachably mounted on said base in spaced relation to said field pieces, a shaft mounted on said uprights and provided with a U-shaped armature of flat steel rotatable within and coacting with said field pieces, a pair of resilient contact bars detachably mounted on said base provided with contacts, and a cam of insulating material disposed on said shaft between said contact bars to coact therewith.

PHILLIP MOVITZ.

REFERENCES CITED

The following references are of record in the file of this patent:

UNITED STATES PATENTS

| Number | Name | Date |
| --- | --- | --- |
| 502,377 | Paugh | Aug. 1, 1893 |
| 1,046,834 | Mills | Dec. 10, 1912 |
| 2,415,715 | Upham | Feb. 11, 1947 |

FOREIGN PATENTS

| Number | Country | Date |
| --- | --- | --- |
| 763,228 | France | Feb. 5, 1934 |